United States Patent [19]

Kulju et al.

[11] Patent Number: 4,870,663
[45] Date of Patent: Sep. 26, 1989

[54] METHOD FOR SELECTING THE MODE OF OPERATION OF AN OBJECT COUNTING MEANS

[75] Inventors: Hannu Kulju; Risto Kontturi, both of Hyvinkaa, Finland

[73] Assignee: Kone Elevator GmbH, Baar, Switzerland

[21] Appl. No.: 156,762

[22] Filed: Feb. 17, 1988

[30] Foreign Application Priority Data

Feb. 17, 1987 [FI] Finland .................................. 870666

[51] Int. Cl.$^4$ ........................ G01S 15/04; G08B 13/18
[52] U.S. Cl. ...................................... 367/94; 340/554; 342/28
[58] Field of Search ............... 340/554; 367/94; 377/6; 342/28

[56] References Cited

U.S. PATENT DOCUMENTS

| 3,728,721 | 4/1973 | Lee et al. | 340/554 |
| 3,925,773 | 12/1975 | Green | 342/28 |
| 4,322,722 | 3/1982 | Kozdon | 340/554 |
| 4,433,328 | 2/1984 | Saphir et al. | 342/28 |
| 4,528,679 | 7/1985 | Shahbaz et al. | 377/6 |
| 4,727,522 | 2/1988 | Steiner et al. | 367/94 |
| 4,743,886 | 5/1988 | Steiner et al. | 340/554 |

Primary Examiner—John S. Heyman
Attorney, Agent, or Firm—Sughrue, Mion, Zinn, Macpeak and Seas

[57] ABSTRACT

A method is disclosed for selecting different modes of operation of a means used for counting objects in a given area, such as persons waiting in an elevator lobby. In the method, the movements of the objects are monitored with at least one Doppler radar by observing the Doppler frequencies of the signals reflected by the objects. The method is characterized in that the operation of the means is switched between two modes of operation, so that the mode of operation primarily carrying out the counting of objects on the basis of their stopping and starting is used during a given time interval, and the mode of operation primarily observing merely the movements of the objects is used during another given time interval.

8 Claims, 3 Drawing Sheets 4,870,663

METHOD FOR SELECTING THE MODE OF OPERATION OF AN OBJECT COUNTING MEANS

FIELD OF THE INVENTION

The present invention relates to a method for selecting the mode of operation of a means used for counting objects in a given area, such as persons waiting in an elevator lobby, in which the movements of the objects is observed by monitoring with at least one Doppler radar the Doppler frequencies of the signals reflected from the objects.

DESCRIPTION OF THE PRIOR ART

A method and apparatus are known from Finnish Pat. No. 73,090 and U.S. Pat. No. 4,800,386 (incorporated herein by reference for counting objects such as persons, in a certain area by monitoring their acceleration from and deceleration to standstill. In the prior method, the movements of the objects are followed with one Doppler radar by observing the Doppler frequencies of the signals reflected by said objects. The purpose is to provide a simple, accurate and favorably priced system for counting moving objects. This is accomplished by amplifying the Doppler signal from each object to become a signal independent of the distance and size of the object and having substantially constant intensity, its frequency being examined by the way that any object changing its speed is indicated as a signal changing its frequency and which is identified. Depending on whether the signal represents acceleration or deceleration of the object, the value stating the number of objects present in the area is incremented or decremented. It is possible with the aid of that procedure to measure reliably e.g. different types of movement of people, such as their stopping and starting within a given, confined area, such as an elevator lobby.

BRIEF SUMMARY OF THE INVENTION

An object of the present invention is to develop further the operation of apparatus of this type by modifying the apparatus, as required, to assume different modes of operation.

Accordingly, the invention provides a method for selecting different modes of operation of a means used for counting objects, such object counting means comprising means for following the movements of the objects with at least one Doppler radar and studying the Doppler frequencies of the signals reflected by the objects, which comprises switching the function of the counting means between two modes of operation, so that in a first mode of operation said object counting means primarily performs an object count based on stopping and starting of said objects and is used during a given time interval, and in a second mode of operation primarily observes merely the movement of objects and is used during another given time interval.

The invention is therefore based on distributing the operation of object counting means, by dividing intended for counting the said modes between two different modes of operation as follows:

(a) Normal operation:
  this is generally used in daytime, as disclosed in Finnish Pat. No. 73,090 and U.S. Pat. No. 4,800,386, for counting persons coming to the elevator.
(b) Applications for area monitoring:
  (i) Security:
    this is used merely for detecting movement, e.g. at night, or at other desired times, when it is desired to guard the security of the premises to observe movements of people,
    when movements of any persons are registered, a message is transmitted through over the elevator computers, e.g. by the following route: from group control to data compiler to—external alarm system,
    there may be a plurality of means, e.g. on different floors, all of them connected to the group control computer, or to the respective elevator-specific computer.
  (ii) Emergency:
    this is used in limited circumstances, and in elevator lounges of a specific type,
    an external call can be generated before the passenger has time to press the call button as in cases such as the passenger collapsing,
    it is based on sophisticated observation of the person's movements, such as detecting that the person was at one moment standing up but was prone a moment later.

The selection of modes of operation may be carried out by the same computer to which the apparatus is connected, e.g. the group control computer of the elevator.

A counting means employing Doppler radar and used at times for counting elevator passengers in an elevator lobby of a building, may at other times be used as part of the security monitoring system of that building. Such other times are, for instance, at night and during weekends. The modes of operation of the counting means may be selected either on the basis of codes stored fixedly in the internal memory of the counting means, or the selection may take place through an external connection. When a passenger counter is associated with the elevator system, the selection of the mode of operation may be carried out by the computer controlling the elevator system.

The procedure of the invention enables object counters employing Doppler radar to be put to new uses, and it is possible in this way to combine the ability of the elevator control system to adapt rapidly to different load situations and the ability of the elevator control system to, control traffic flow in a confined area, such as in the elevator lobby.

The method of the invention requires no changes of existing apparatuses: the observation requirements implied by different modes of operation can be accomplished by minor additions to software, and there is no effect on the price of the apparatus even though a sophisticated additional option is thus provided.

BRIEF DESCRIPTION OF THE DRAWINGS

Further objects, features and advantages of the invention will become apparent to those skilled in the art from the following description thereof when taken in conjunction with the accompanying drawings, in which.

DESCRIPTION OF THE PREFERRED EMBODIMENT

Figure 1:
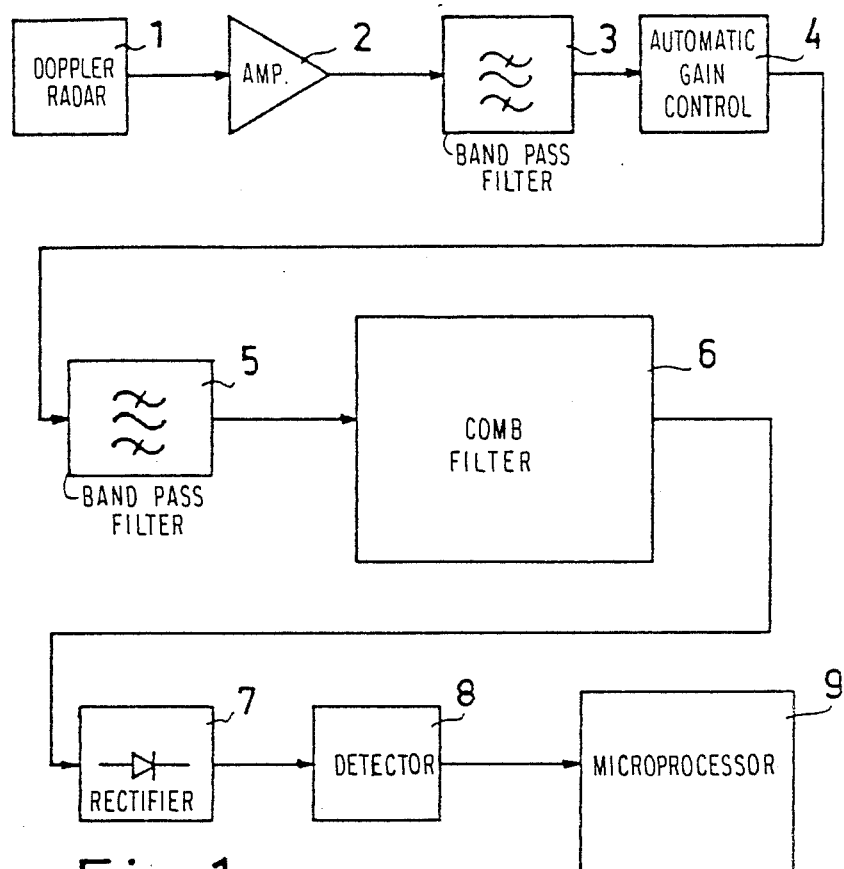
FIG. 1 shows diagrammatically the means according to Finnish Pat. No. 73,090 and U.S. Pat. No. 4,800,386.

Referring now to FIG. 1, the signal from Doppler radar 1 is amplified in amplifier 2 and conducted to an analog band-pass filter 3. In the present embodiment, the radar operates in the GHz range, e.g. at 24 GHz frequency. The signal obtained from the band-pass filter is passed to an automatic gain control unit 4 which corrects the signal so that it is independent of the distance between the radar and the object and of the size of the object. This is simply accomplished by amplifying the strongest radar signal received to the same level in every instance. The radar signal from each moving person is processed in turn, since stationary persons may be disregarded. From the automatic gain control unit, the signal is conducted through a digital band-pass filter 5 to a filter bank, or comb filter 6, composed of narrowband filters.

As will now be apparent to those skilled in the art, (i) rectifier 7 converts the samples of the signals in the frequency channels (separated by the comb filter 6) into rectified a.c. signals (by inversion of the signal samples received from the comb filter), (ii) detector 8 detects from such rectified signal samples those frequencies which contain information relating to the movement of people and (iii) microprocessor 9 determines the pace at which detected consecutive rectified signal samples are transmitted from the comb filter 6 and also determines the manner and rate at which information from such detected consecutive rectified samples are processed.

The frequency band is thus divided into several narrow frequency bands, whereby examination of the amplitudes occurring in different frequency bands and their shifts over the course of time from one band to another enables the rate of acceleration or deceleration of the person under observation to be determined.

The extent of the area observed by such radar, and the sensitivity of the radar, can be controlled by altering the gain of the automatic gain control unit. The invention is largely based on the insight that the modes of operation of the radar can be determined and changed merely by manipulating the gain of the automatic gain control unit 4. This can be achieved by, for example controlling transistor switches.

Figure 2:
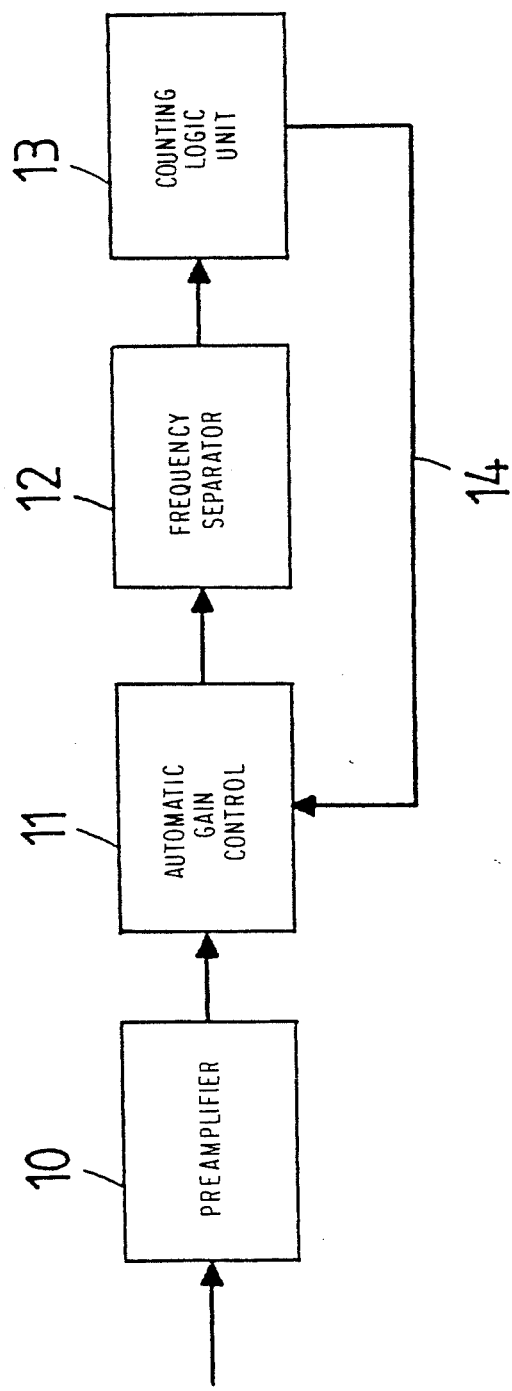
FIG. 2 is a block diagram of an apparatus implementing the method of the invention.

Referring to the foregoing, an apparatus implementing an embodiment of the invention is presented in a block diagram in FIG. 2. Block 10 therein denotes the preamplification unit for preamplifying the radar signal, block 11 the automatic gain control and block 12 the frequency separator unit. Block 13 refers to the counting logic unit actually implementing the method, e.g. a microcomputer, which changes the modes of operation of the radar through return lead 14. As has been stated earlier, this may take place at fixed intervals, or in response to an external command.

Figure 3:
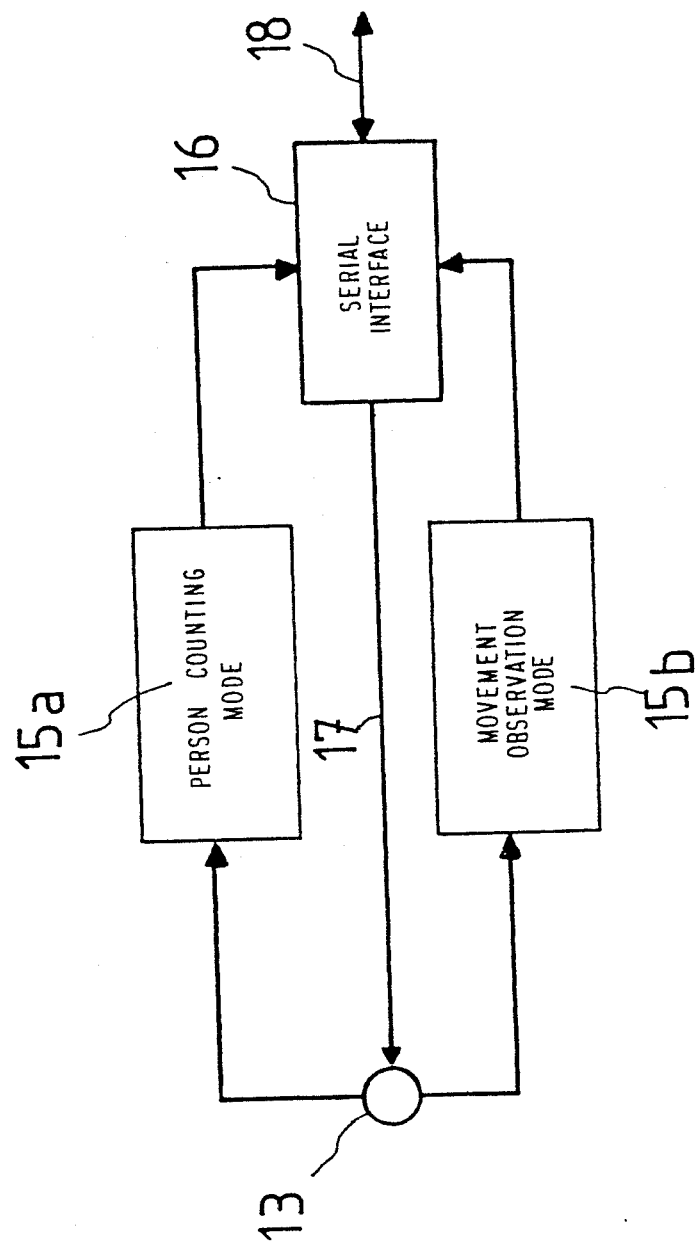
FIG. 3 is a block diagram showing the logic distribution between various modes of operation, and their interfacings.

FIG. 3 shows how control by external command may be implemented. The counting logic unit 13 receives selection control 17 over its serial interface 16 through a line 18 coming, e.g., from the elevator group control. The counting logic unit 13 selects, e.g., in the present embodiment, depending on the instruction, either the person counting mode 15a, which would usually be applied in daytime, or the movement observation mode 15b, which would usually be used for passage surveillance during the night.

The serial interface 16 is bidirectional so that the group control receives the data it needs over the same line 18. The function blocks 15a and 15b represent, in the present embodiment, different states of the gain control unit 11.

In the method of the invention, it is easy to avoid interference factors which could cause unpleasant errors in security surveillance applications. In the movement observation mode, the equipment may compare observed events, with a reference set of observations stored in its memory. Such comparison enables, for instance, limiting values to be fixed, which indicate, for instance, how long an observed object has to move in the radar beam before a report of the observation is sent out.

Within one mode of operation control of the sensitivity of the equipment by controlling the AGC setting provides the additional feature, that in the movement observing operation, mentioned above, a wider area can be monitored than is necessary, in daytime when counting persons waiting for an elevator. The loss of accuracy is not objectionable if the area under surveillance can be substantially increased and if the loss in accuracy may be compensated for. Means for compensating for loss of accuracy are, for example, setting a cut-off frequency or setting a minimum time for how long an object must move in the area before observed movement is reported. by the means.

It will be apparent to those skilled in the art that the invention is not restricted to the embodiments described in the foregoing, but that it may be varied within the scope of the claims presented below.

We claim:

1. A method for selecting different modes of operation of an object counting means, such object counting means comprising means for following the movements of objects with at least one Doppler radar and studying the Doppler frequencies of the signals reflected by said objects, which method comprises,
   switching the function of said object counting means between two modes of operation, so that in a first mode of operation said object counting means primarily performs an object count based on stopping and starting of said objects and is used during a given time interval, and in a second mode of operation said object counting means primarily observes merely the movement of objects and is used during another given time interval.

2. A method according to claim 1, wherein said object counting means is capable of storing time codes and the operation of said object counting means is changed in accordance with time codes stored in said object counting means.

3. A method according to claim 1, wherein the operation of said object counting means is changed according to commands supplied by an external control system.

4. A method according to claim 1, wherein said object counting means has memory and in said second mode of operation a reference set of observations stored in said memory is compared to observed events.

5. A method according to claim 1, further comprising amplifying the Doppler signal emitted by each of said objects to become a signal that is independent of the distance and the size of each of said objects, and of substantially constant intensity, and examining the frequency of said signal so that an object moving in the beam of said Doppler radar produces a change in the signal detected by said Doppler radar.

6. A method according to claim 1, wherein the area in which observations are made is changed in accordance with said modes of operation of said object counting means.

7. A method according to claim 1, wherein the sensitivity of said object counting means is changed in accordance with said modes of operation of said object counting means.

8. A method according to claim 1, wherein the objects to be counted are persons waiting in an elevator lobby.

* * * * *